United States Patent [19]

Kawanaka

[11] Patent Number: 4,864,550

[45] Date of Patent: Sep. 5, 1989

[54] REMOTE CONTROL EQUIPMENT FOR USE WITH AN AUDIO SYSTEM

[75] Inventor: Yoshikazu Kawanaka, Kanagawa, Japan

[73] Assignee: U.S. Philips Corporation, New York, N.Y.

[21] Appl. No.: 213,504

[22] Filed: Jun. 28, 1988

Related U.S. Application Data

[63] Continuation of Ser. No. 97,291, Sep. 14, 1987, abandoned, which is a continuation of Ser. No. 708,315, Mar. 5, 1985, abandoned.

[30] Foreign Application Priority Data

Mar. 7, 1984 [JP] Japan .................................. 59-42161

[51] Int. Cl.$^4$ .......................... G11B 31/00; H04B 1/20
[52] U.S. Cl. ........................................... 369/6; 369/2; 369/24; 455/352; 455/353
[58] Field of Search ................. 369/6, 24, 2; 455/352, 455/353; 358/335; 360/137; 364/138

[56] References Cited

U.S. PATENT DOCUMENTS

| | | | |
|---|---|---|---|
| 3,755,818 | 8/1973 | Greenspan | 369/6 |
| 3,794,985 | 2/1974 | Dezaki | 455/352 |
| 4,145,720 | 3/1979 | Weintraub et al. | 455/353 |
| 4,270,226 | 5/1981 | Weintraub et al. | 455/353 |
| 4,399,502 | 8/1983 | MacDonald et al. | 364/138 |
| 4,482,947 | 11/1984 | Zato et al. | 364/138 |
| 4,527,204 | 7/1985 | Kozakai et al. | 455/353 |

OTHER PUBLICATIONS

"PCM Remote Control Chips Detect Transmission Errors", Electronic Engineering, Apr. 1983, pp. 41–47.
"Low Power Fernbedinungs-Sender SAA3004", Valve Elektronsc Reinformation 820421, Apr. 1982, pp. 1–9.

Primary Examiner—Alan Faber
Assistant Examiner—Hoa T. Nguyen
Attorney, Agent, or Firm—Edward W. Goodman

[57] ABSTRACT

A remote control handset for use with an audio system in which the audio system includes a tuner, a compact disk player an amplifier, speakers, etc. The handset also includes a display for displaying the information contents of the control signals. A cassette recorder also incorporated in the handset produces an output signal which is modulated on a special carrier and transmitted over a signal path to an antenna coupled to the tuner of the audio system in order to reproduce the recorded signals.

4 Claims, 1 Drawing Sheet

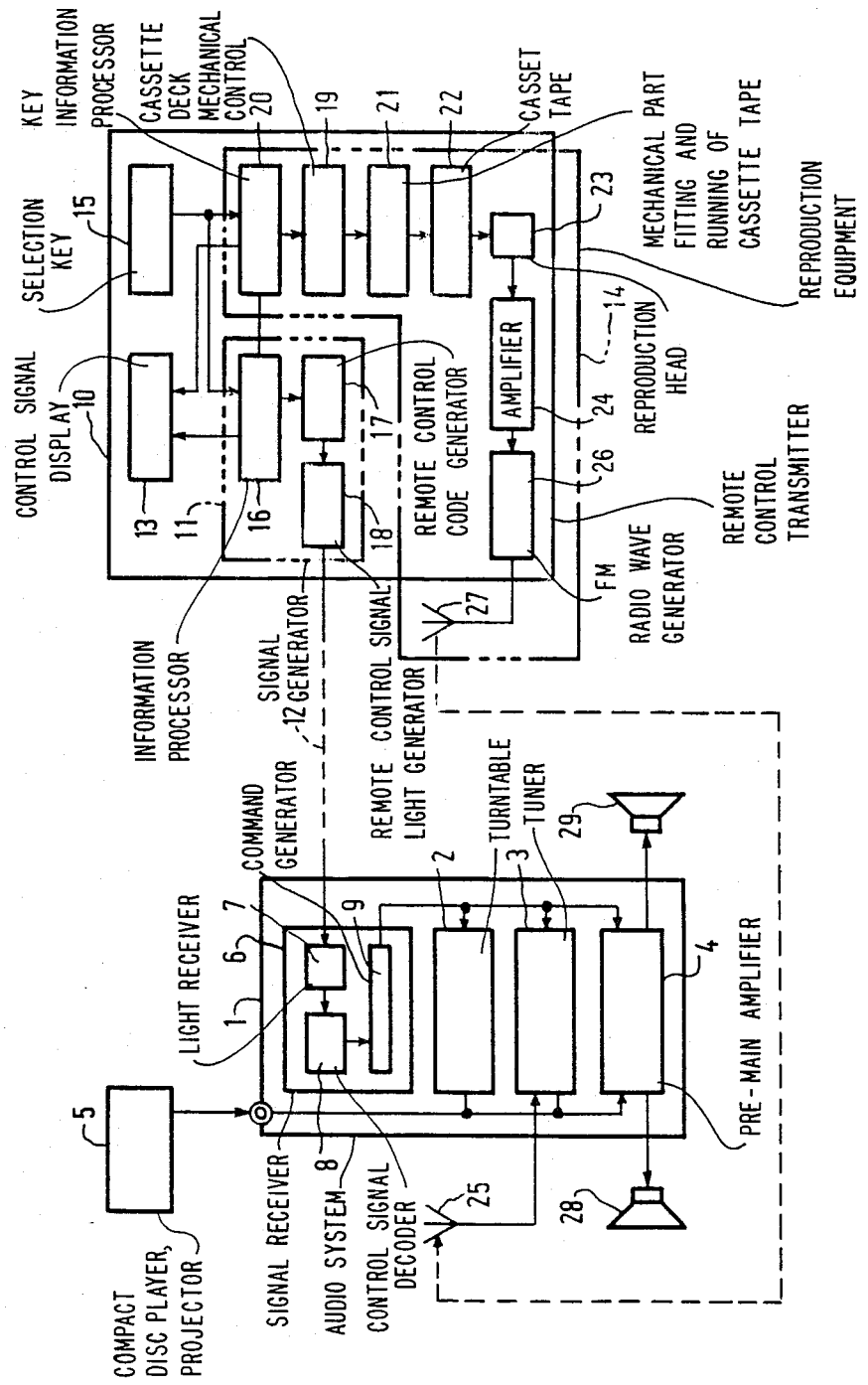

REMOTE CONTROL EQUIPMENT FOR USE WITH AN AUDIO SYSTEM

This is a continuation of application Ser. No. 097,291, filed Sept. 14, 1987, now abandoned, which is a continuation of Ser. No. 708,315, filed Mar. 5, 1985, now abandoned.

BACKGROUND OF THE INVENTION

1. Field of the Invention

This invention concerns remote control equipment for an audio system including subsystems such as a premain amp, tuner, speakers etc. and which are controlled from a remote location.

2. Description of the Prior Art

In general, an audio system consists of a combination of amplifier, tuner, tape deck, speakers etc. In this case a cassette tape is run by the mechanical part of the tape deck in order to reproduce the audio signal which has been recorded on the cassette tape, the audio signal of the cassette tape is controlled by a controlling device which is established on the cassette deck, the control mode is verified by the cassette deck display device and the controlled audio signal is then amplified by the pre-main amplifier and then reproduced by the speakers.

Hence the cassette deck must include the mechanical part for running the cassete tape, the control device for controlling the cassette tape and the display device for displaying the control mode so that the equipment itself is large in size and, from the point of view of cost, an expensive tape deck is employed. Moreover it is difficult to verify the running mode of the cassette tape from a remote location usng the cassette deck display device so that it is necessary for the operator or user to move closer to the subsystem in order to carry out such verification. Furthermore, since conventional construction has not permitted the execution of delicate sound volume adjustments, etc., from a location remote from the audio system, it has been necessary to move between the listening position and the audio system to adjust the tape deck or the premain amp and to check the suitability of the sound volume, which has been troublesome and has led to operational difficulties.

OBJECT AND SUMMARY OF THE INVENTION

It is an object of the present invention to overcome the problems described above. Thus the invention is intended to provide remote control equipment for audio systems which can be operated from a large distance for the reproduction of a cassette tape, and which allows a cassette tape to be reproduced without a tape deck which consists of a variety of large components. Thus, the cost of the equipment can be reduced and the system component can be made more compact.

According to the invention, the remote control equipment for use with an audio system includes subsystems such as an amplifier, tuner, speakers etc. The remote control equipment has a transmitter and a receiver, the transmitter having a signal generating part which converts various control signals for controlling the functions of each of the aforementioned subsystems into a composite control signal which includes control signals for tuning the tuner to a transmitting signal frequency at which the audio signal of a cassette tape etc. has been modulated, has a key processing part to which an operating key is connected and which produces this composite control signal modulated on a carrier, and a display device which displays the information contained in the composite control signal. Also, an audio signal transmitting device which modulates and transmits the aforementioned audio signal produced by the cassette tape reproduction equipment is established separately from the aforementioned audio system. The remote control equipment further includes a receiver which receives the composite control signal from the signal generating part of the aforementioned remote control transmiter and a tuner which is controlled by the control signal form part of the audio system. The composite control signal includes tuning frequencies for each of the subsystems including the aforementioned tuner and the modulated audio signal of the cassette tape is produced by a transmitting device located on the aforementioned remote control device so that when the cassette tape is fitted into the aforementioned reproduction equipment and the system starts to run, the aforementioned tuner is tuned and the audio signal which has been recorded on the aforementioned cassette tape is reproduced by the speakers which are connected to the said tuner.

DETAILED DESCRIPTION OF THE INVENTION

An example of the invention will now be described with reference to the drawing.

In the Figure, 1 is the audio system, and the subsystems consist of a turntable 2 of a record player, a tuner 3, a pre-main amplifier 4 and a compact disc player, projector etc. 5. Each of the aforementioned devices 2, 3, 4, 5 which are incorporated into the audio system 1 are set in such a way that they can be operated upon receiving a composite control signal which is received by the signal receiving part 6. The signal receiving part 6 consists of a light receiving part 7 which takes in a composite control signal which includes a control signal which tunes to the transmission signal frequency (FM frequency) at which the audio signal of the cassete tape etc. has been modulated, and which has been generated by the remote control equipment. A remote control receiver which is established at a location remote from the body of the audio system 1, includes a control signal decoding part 8 which decodes the composite control signal which has been received by the light receiving part 7 and a control signal command generating part 9 which replaces the composite control signal and outputs commands for the operation of the aforementioned components 2, 3, 4 and 5.

The aforementioned remote control transmitter 10 consists essentially of a signal generating part 11 which modulates on an infra red carrier, the composite control signal. A control signal display part 13 which consists of a display device displays the information included in the composite control signal.

The signal generating part 11 includes a key information processing part 16 which converts the control information which has been selected via the selection key to a composite control signal, a remote control code generating part 17 which takes in the composite control signal from the information processing part 16 and produces a remote control code, and a remote control signal light generating part 18 which converts the remote control code for transmission over transmission path 12 to the audio system 1. The control signal display part 13 displays the information contained in the composite control signal, such as the controlled subsystem which has been selected by the selection key 15, and whether or not the tuner 3 has been set in the reception mode for receiving an FM wave which is being transmitted by the reproduction equipment 14. It is also possible to display the running state of the cassette tape which has been fitted in the reproduction equipment by means of a signal and a flashing light, etc., on the top of the cover (not shown in the drawings of the remote control transmitter 10). The reproduction equipment 14 consists of a key information processing part 20 which processes the cassette deck key information. In response to the operation of that key, it produces a composite control signal which is applied to information processing part 16. It also controls the operation of the cassette deck mechanical control part 19, the mechanical part 21 for fitting and running the cassette tape, the cassette tape 22, the reproduction head 23 which reproduces the audio signal which has been recorded on the casette tape 22, the amplifier 24 which amplifies the audio signal which has been reproduced by the reproduction head 23 and the weak FM radio wave signal generator 26 so that the audio signal which has been amplified by the amplifier 24 and which modulates the weak FM radio wave can be received via transmission antenna 27, by the reception antenna 25 connected to tuner 3.

Hence the remote control transmitter 10 has a signal generating part 11 which generates a composite control signal for the tuner 3 and the other subsystems 2, 4 and 5 which can be selected with the selection key 15. This control signal is received by the light receiving part 7 of the receiver 6 coupled to the audio system. This remote control transmitter also includes a second transmitting system which transmits audio signals recorded on the cassette tape 22 towards the receiving antenna 25 of the tuner 3. Moreover the receiving antenna 25 of the aforementioned tuner 3 is established in such a way that when a cassette tape 22 has been fitted in the mechanical part 21 and the cassette tape has started to run, the audio signal which has been recorded on the cassette tape is modulated on an FM wave and transmitted, and when the cassette tape 22 is removed from the mechanical part 21 it switches to the receiving condition for the carrier wave to which it was pre-set.

In the drawing, 28 and 29 are the speakers, or audio reproduction transducing means which reproduce the audio signal produced by the tuner. Moreover, the aforementioned carrier is not limited to the infra red radiation 12 and visible light. Ultrasonic waves or FM radio waves, etc., can be employed for this purpose. In such cases the signal generating part 11 on the remote control transmitter 10 and the light receiving part 7 on the receiving part 6 are replaced respectively, by parts which correspond to the carrier which is being used.

The operation of the invention is described below.

First, the cassette tape 22 on which the desired audio signal has been recorded is fitted into the mechanical part 21 of the remote control transmitter 10, and the selection key 15 for the cassette tape 22 is pressed. Then, the composite control signal which includes the control signal for tuning to the signal transmission frequency (FM frequency) of the audio signal of the cassette tape is transmitted via the infra red transmission path 12 to the light receiving part 7 of the audio system 1, and the control signal command part 9 of the receiving part 6 produces a control signal (modulation command) for the acceptance of that FM wave so that the audio signal of the cassette tape can be reproduced by tuner 3. At this time the information contained in the composite control signal selected by the selection key 15 is displayed on the display device 13. This information may include the frequency in the MHz frequency wave band which has been selected, and the sound volume.

When the part of the selection key 15 which establishes the running condition of the cassette tape 22 is pressed the mechanical part 21 operates, the cassette tape 22 runs, the audio signal which has been recorded on the cassette tape 22 is reproduced by the reproduction head 23, the audio signal is modulated on a weak FM radio wave produced by the weak FM radio wave generating part 26, and this FM wave is transmitted towards the signal receiving antenna 25 of the tuner 3 from the signal transmitting antenna 27. The FM wave (audio signal) which is received by the signal receiving antenna 25 is then reproduced by the speakers 28 and 29 via the tuner 3 and the pre-main amplifier 4.

Hence, no take deck is incorporated into the audio system and this means that the system can be made in a more compact form. Furthermore, the desired cassette 22 can be fitted easily into the mechanical part 21 of the remote control transmitter 10 at a location (in hand) remote from the system component. The cassette tape 22 can also be exchanged easily, and can be operated with the remote control in hand so there is a considerable improvement in operability.

What is claimed is:

1. A remote control arrangement for use with an audio system, said audio system at least having a tuner for receiving and detecting a modulated carrier representing an audio signal generated from said remote control arrangement, and audio reproduction transducing means for aurally reproducing said audio signal, said remote control arrangement comprising:

remote control transmitter including selection means for selecting the function to be performed by said audio system and outputting a selection signal, transmitter reproduction means for reproducing and transmitting said audio signal from an audio storage means in response to said selection signal, control signal generator for generating and transmitting a control signal in response to said selection signal; and remote control receiver coupled to said audio system, for receiving said control signal and generating a command signal in response thereto, to control the operation of said tuner and said audio reproduction transducing means.

2. The remote control arrangement in claim 1 wherein said control signal includes a component for tuning said tuner to the frequency of said carrier.

3. The remote control arrangement in claim 1 wherein said audio storage means is an audio tape.

4. The remove control arrangement in claim 1 wherein said selection means includes a keyboard for inputting through keys, the selected functions.

* * * * *